(12) United States Patent
Dirk et al.

(10) Patent No.: US 8,223,472 B1
(45) Date of Patent: Jul. 17, 2012

(54) NORBORNYLENE-BASED POLYMER SYSTEMS FOR DIELECTRIC APPLICATIONS

(75) Inventors: Shawn M. Dirk, Albuquerque, NM (US); David R. Wheeler, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 856 days.

(21) Appl. No.: 12/270,879

(22) Filed: Nov. 14, 2008

(51) Int. Cl.
*H01G 4/06* (2006.01)
*H01G 5/013* (2006.01)
*H01G 9/00* (2006.01)
*H05K 7/00* (2006.01)

(52) U.S. Cl. ......... 361/311; 361/313; 361/524; 361/746
(58) Field of Classification Search ................. 361/311, 361/746, 524, 313
See application file for complete search history.

(56) References Cited

U.S. PATENT DOCUMENTS

| | | | |
|---|---|---|---|
| 5,401,558 A | 3/1995 | Sakamoto et al. | |
| 5,538,756 A | 7/1996 | Korleski et al. | |
| 6,551,653 B1 | 4/2003 | Hatke et al. | |
| 6,556,421 B2 * | 4/2003 | Aoki et al. | 361/311 |
| 6,630,234 B1 | 10/2003 | Tanisho et al. | |
| 6,653,424 B1 | 11/2003 | Sakamoto et al. | |
| 7,605,394 B2 * | 10/2009 | Marks et al. | 257/40 |
| 7,724,502 B2 * | 5/2010 | Petržilek et al. | 361/523 |
| 2005/0014916 A1 * | 1/2005 | Sakamoto et al. | 526/172 |

* cited by examiner

*Primary Examiner* — Eric Thomas
*Assistant Examiner* — Arun Ramaswamy
(74) *Attorney, Agent, or Firm* — Elmer A. Klavetter; Kevin W. Bieg

(57) ABSTRACT

A capacitor having at least one electrode pair being separated by a dielectric component, with the dielectric component being made of a polymer such as a norbornylene-containing polymer with a dielectric constant greater than 3 and a dissipation factor less than 0.1 where the capacitor has an operating temperature greater than 100° C. and less than 170° C.

8 Claims, 3 Drawing Sheets

1

2

3

4

5

NORBORNYLENE-BASED POLYMER SYSTEMS FOR DIELECTRIC APPLICATIONS

This invention was made with Government support under Contract No. DE-AC04-94AL85000 awarded by the Department of Energy. The Government has certain rights in the invention.

BACKGROUND OF THE INVENTION

The invention describes polymers for use in dielectric applications and, more particularly, to high-dielectric norbornylene-based polymers used in dielectric applications.

Capacitors, which basically include two electrodes separated by a dielectric material, are used in a wide variety of electrical applications to accumulate and store an electrical charge. The development of electronic devices and circuits of reduced size has led to a need for significantly smaller capacitors having increased capacity per unit volume and high temperature capabilities.

Recently much research has focused on the development of new polymer dielectric materials for next generation capacitors that may find use in the inverters of next generation hybrid electric vehicles (HEV). Capacitors used in HEVs inverters will be required to operate at 150° C., 600V, and have an energy density of 0.9 J/cm$^3$. Polymer based thin film capacitors are ideal for this application due to their relatively high energy density, low cost, and high dielectric breakdown field. Perhaps one of the most beneficial attributes of thin polymer film based capacitors is their propensity to fail gracefully open rather than short. Currently polymer film capacitors rely on polymers with dielectric constants ranging from 2-3.5. The current polymer based capacitors have ceiling operational temperatures of between 105° C. and 120° C. because as the polymer dielectric temperature rises typically the dissipation factor increases above a usable value.

Useful would be polymer films with dielectric constants greater than approximately 3 and with low dissipation factors that can operate at elevated temperatures greater than 120° C.

BRIEF DESCRIPTIONS OF THE DRAWINGS

DESCRIPTION OF SPECIFIC EMBODIMENTS

Figure 1:
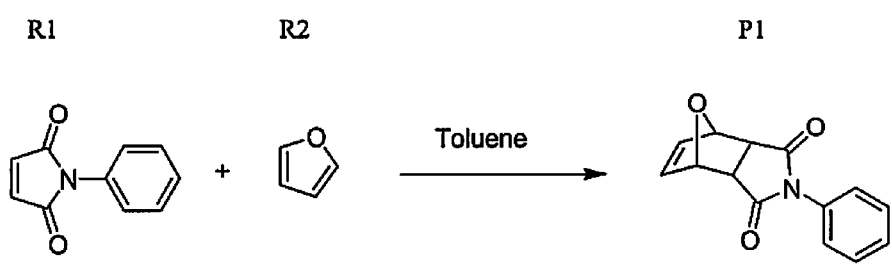
FIG. 1 shows the synthesis of N-Phenyl-7-oxabicyclo(2.2.1)5-heptene-2,3-dicarboximide from the Diels Alder reaction of furan and N-phenyl maleimide.

The present invention provides a capacitor with at least one electrode pair with the electric pair being separated by a dielectric component, the dielectric component comprising a norbornylene-containing polymer compound with a dielectric constant greater than approximately 3 and a dissipation factor less than 0.1. In one embodiment, the dielectric component comprises the norbornylene-containing polymer on a substrate. In another embodiment, the capacitor comprises a dielectric component that is a free-standing film formed by spinning said norbornylene-containing polymer onto siloxane-treated Mylar (a polyester film product made from the resin polyethylene terephthalate).

In another embodiment, the invention is a method of using a capacitor implemented in an electronic device comprising providing a capacitor comprising a norbornylene-containing polymeric dielectric material having a dielectric constant of at least 3 and a dissipation factor less than 0.1 and charging said capacitor to deliver an electric charge in an electronic device. The materials and device can be utilized at temperatures as high as 170° C.

Various polynorbornylene (or polynorbornene) compounds can be used in these film capacitors. The norbornylene monomers, known in the art, can be synthesized and modified to add functionality. In one embodiment, polynorbornylenes can be polymerized using ring opening metathesis polymerization (ROMP), a living polymerization that allows very good control over the final polymer molecular weights. In one embodiment (see FIG. 1), the monomer N-Phenyl-7-oxabicyclo(2.2.1)5-heptene-2,3-dicarboximide (compound P1 in FIG. 1) was synthesized where its chemical structure contains a large heteroatom content and contains an imide functional group. Investigations have shown that the dielectric constant typically increases with increased heteroatom content. The imide functional group was utilized because of the superior high temperature performance of Kapton materials. The N-Phenyl-7-oxabicyclo(2.2.1)5-heptene-2,3-dicarboximide monomer was synthesized from the Diels Alder reaction of furan (compound R2 in FIG. 1) and N-phenyl maleimide (compound R1 in FIG. 1).

In order for a polymer to be useful as a dielectric for use in such applications as electric vehicles or aircraft, the polymer needed to have a relatively high dielectric constant (when compared to other carbon based polymers) and a low dissipation factor. In addition the polymer dielectric film needs to be flexible enough to allow for the production of rolled or stacked capacitors.

The homopolymer of N-Phenyl-7-oxabicyclo(2.2.1)5-heptene-2,3-dicarboximide exhibited very good electrical properties, with a dielectric constant (k)=6.0 and a low dissipation factor at 2 kHz. The homopolymer did not enable the fabrication of thin free standing films as it was very brittle. The glass transition temperature ($T_g$) of the homopolymer was 172° C. In order to lower the $T_g$ of the polymer, N-Phenyl-7-oxabicyclo(2.2.1)5-heptene-2,3-dicarboximide was copolymerized with (norbornylene) norbornene to lower the $T_g$ of the resulting material to 72° C.

Once the copolymer was synthesized it was redissolved in chloroform and cast using a drawdown machine. The polymer solution was placed on a sheet of non-stick material (such as Teflon, a fluorinated ethylene compound) in order to allow for easy removal of the formed film. Using this method, large (8.5"×11") area polymer films were produced. The thickness of the polymeric material was controlled by using different metering rods on the drawdown machine. Using this technique, polymer films were produced ranging in thickness from 2-40 um.

The polymer was removed from the teflon substrate as one single continuous film. The resulting polymer film was cut in order to place the polymer film in an evaporator. The polymer film was completely coated with Au on one side and 1 um$^2$ Au electrodes were coated on the other side of the polymer film. All Au coatings were accomplished using a sputterer.

Figure 2:
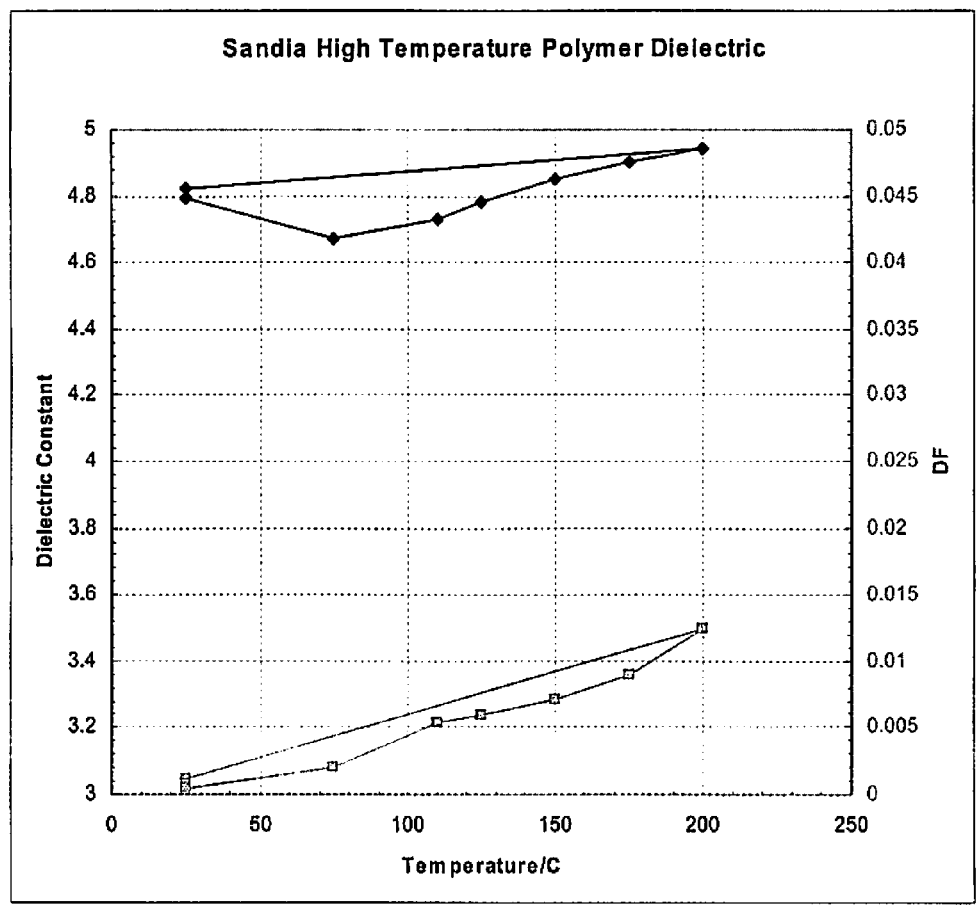
FIG. 2 shows dielectric constant values and dissipation factor values for a N-Phenyl-7-oxabicyclo(2.2.1)5-heptene-2,3-dicarboximide polymer.
Figure 3:
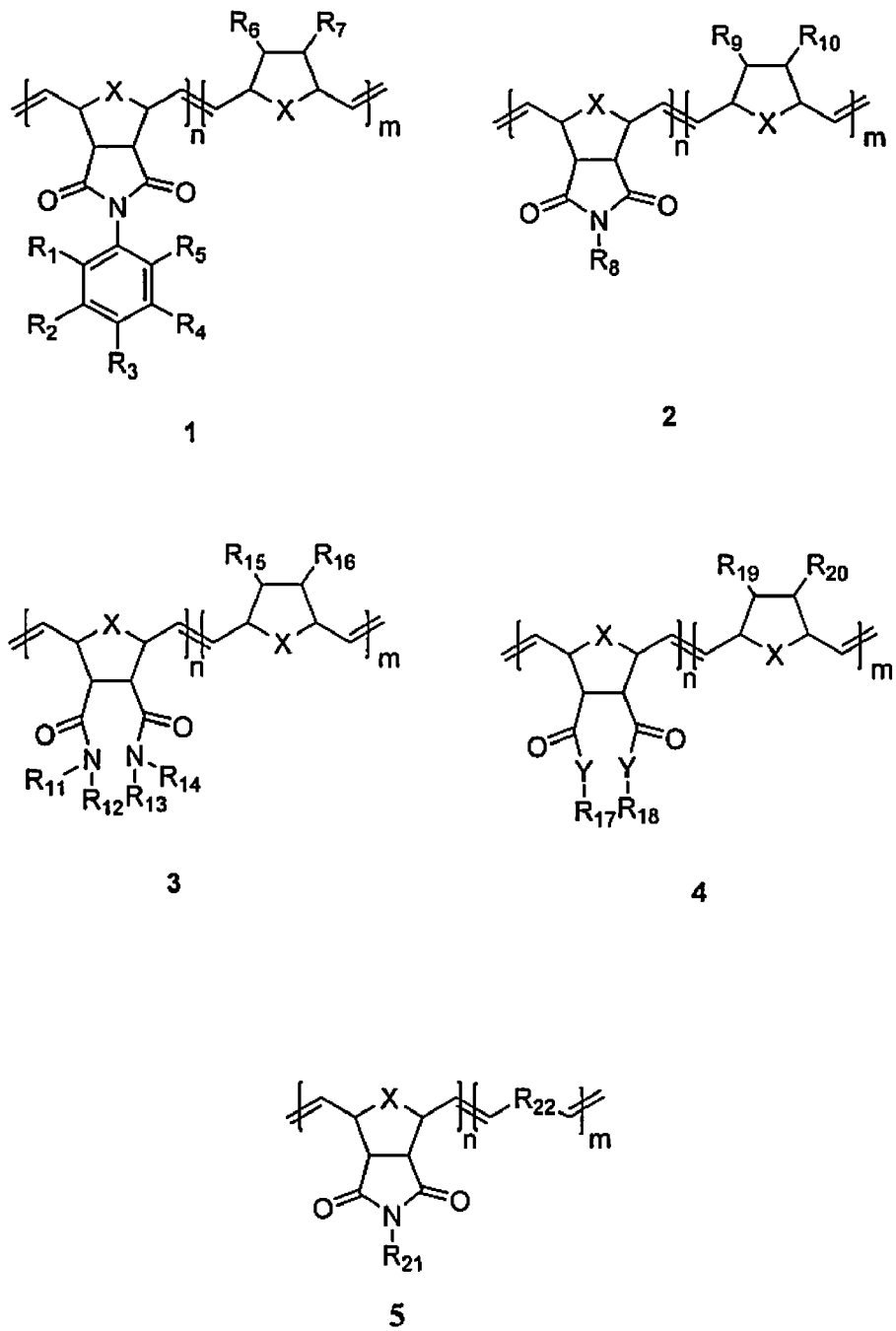
FIG. 3 shows bornylene compounds utilized in the present invention.

A Hewlett Packard 4284A Precision LCR meter was used to measure the capacitance of the small test capacitors and the dielectric constant of the N-Phenyl-7-oxabicyclo(2.2.1)5-heptene-2,3-dicarboximide polymer film was calculated based on the thickness and area of the polymer dielectric. Both the dielectric constant and the dissipation factor were measured as a function of temperature up to 200° C. The results are shown in FIG. 2. The use of a copolymer of N-Phenyl-7-oxabicyclo(2.2.1)5-heptene-2,3-dicarboximide represents a material advance in the area of high temperature capacitors. In one embodiment to form thin film wound capacitors, polynorbornylene compounds were synthesized using ring opening metathesis polymerization techniques (ROMP) and then spun onto aluminum pre-deposited onto a silicon substrate, although substrates made of plastic, metal, and semiconductors can also be used). Top electrodes were evaporated onto the substrate. These substrates, using the compounds described previously as the polybornylene compounds, were shown to have superior dielectric performance having dielectric constants >4.0 and low loss <0.1 dissipation factors. These superior dielectric properties have been observed in a range from room temperature to 150° C. In general, the polymers used contain aryl or hetero-atoms or both. Polymers prepared without these functional groups generally do not perform as well in the desired application as polymeric compounds with at least one of these functions groups. Examples of possible polymers examined are found in FIG. 3. The chemical formula for the compounds shown in FIG. 3 are as follows:

compound 1=$(C_{14}H_6NO_2R_1R_2R_3R_4R_5X)_n$ $(C_6H_6R_6R_7X)_m$;

compound 2=$(C_8H_8NOR_8C)_n(C_6H_6R_9R_{10}X)_m$;

compound 3=$(C_8H_6N_2O_2R_{11}R_{12}R_{13}R_{14}X)_n$ $(C_6H_6R_{15}R_{16}X)_m$;

compound 4=$(C_8H_6O_2R_{17}R_{18}XY_2)_n(C_6H_6R_{19}R_{20}X)_m$; and compound 5=$(C_8H_6NO_2R_{21}X)_n(C_2H_2R_{22})_m$ where X can be oxygen, nitrogen, carbon, or sulfur, Y can be oxygen, nitrogen, or sulfur and $R_{1-22}$ groups can be alkyl, alkenyl, alkynyl, or a partially or totally halogenated alkyl, alkenyl, or alkynyl group. $R_{1-7}$, $R_{9-10}$, $R_{15-16}$, $R_{19-20}$, and $R_{22}$ can also be ether, ester, amine, amide, imide, sulfide, thioester, carbonate, and carbamate groups.

In general, in the capacitor of the present invention, any polymer dielectric can be used that can be formed using ring opening metathesis (ROMP) or acyclic diene metathesis (ADMET) that has a dielectric constant of at least 3 and a dissipation factor less than 0.1.

Polymer compounds R1, R2, and P1 from FIG. 1 were further evaluated by spinning onto siloxane treated Mylar to produce a free standing film. In one embodiment, the spinning solution contains a bisthiol to crosslink the film. All films prepared without the bisthiol were brittle and cracked and not able to be used in the desired application. The bisthiol reacts with the residual olefins in the backbone of the polymer via a radical reaction to form a robust crosslinked network. One polynorbornylene compound synthesized and tested was poly(—N-phenyl-7-oxanorbornene-5,6-dicarboximide) (PPOD) which was shown to have a dielectric constant of 6.3 and a dissipation factor of 0.0016 at 25° C. For temperatures of 140° C. to 150° C., the PPOD material has a dielectric constant of 6.1 and a dissipation factor of 0.0022 (1 kHz). Further, polymer films of PPOD chemistry have been fabricated on Al coated Si wafers with thickness ranging from 6 to 60 micrometer thickness. Importantly, a flexible, free standing film of 1.5 inch diameter and 6 micrometer thickness has also been fabricated. These capacitors of the present invention offer the advantage of providing a polymeric material that exhibits both a high dielectric constant and low loss at high temperature making these materials ideal for use in next generation hybrid car capacitors where operating temperatures are expected to reach a temperature of 170° C. Current hybrid car capacitors have a high operating temperature of approximately 100° C.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A capacitor, comprising at least one electrode pair, said electric pair being separated by a dielectric component, said dielectric component comprising a polymer comprising a norbornylene-containing polymer with a dielectric constant greater than 3 and a dissipation factor less than 0.1, said capacitor having an operating temperature greater than 100° C. and less than 170° C.

2. The capacitor of claim 1 wherein said dielectric component comprises the norbornylene-containing polymer on a substrate.

3. The capacitor of claim 1 wherein said dielectric component comprises a free-standing film formed by spinning said norbornylene-containing polymer onto siloxane-treated Mylar.

4. The capacitor of claim 1 wherein said norbornylene-containing polymer comprises N-phenyl-7-oxabicyclo (2.2.1)5-heptene-2,3-dicarboximide copolymerized with norbornylene.

5. The capacitor of claim 1 wherein said norbornylene-containing polymer comprises poly(—N-phenyl-7-oxanorbornene-5,6-dicarboximide).

6. The capacitor of claim 1 wherein said norbornylene-containing polymer comprises the compounds shown by the formulas

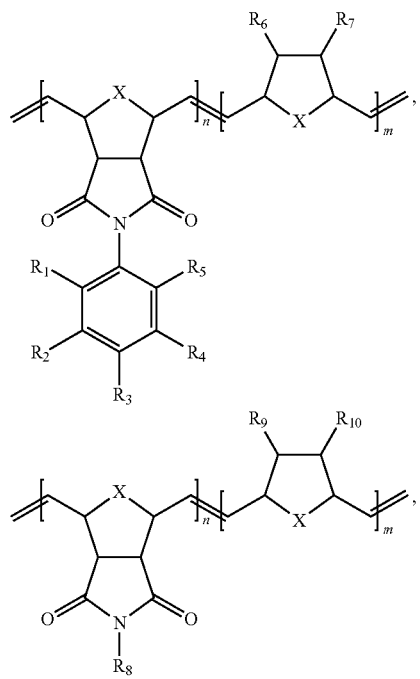

-continued

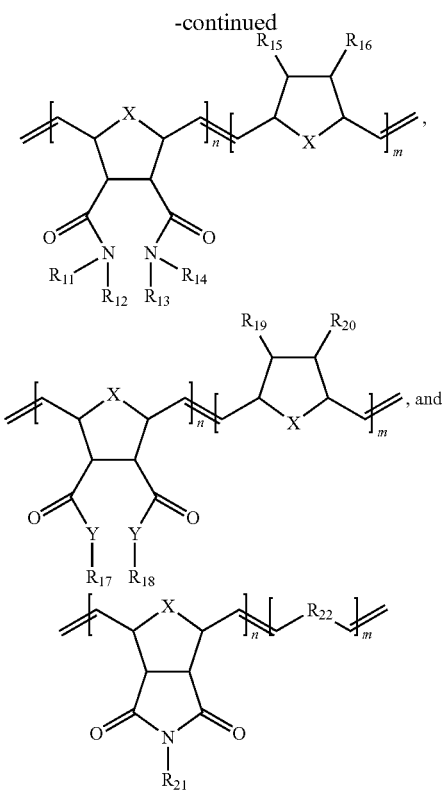

represented by the chemical formula $(C_{14}H_6NO_2R_1R_2R_3R_4R_5X)_n(C_6H_6R_6R_7X)_m$, $(C_8H_6NOR_8C)_n(C_6H_6R_9R_{10}X)_m$, $(C_8H_6N_2O_2R_{11}R_{12}R_{13}R_{14}X)_n(C_6H_6R_{15}R_{16}X)_m$, $(C_8H_6O_2R_{17}R_{18}XY_2)_n(C_6H_6R_{19}R_{20}X)_m$, and $(C_8H_6NO_2R_{21}X)_n(C_2H_2R_{22})_m$, respectively, wherein X is selected from oxygen, nitrogen, carbon, and sulfur, Y is selected from oxygen, nitrogen, and sulfur and $R_1$ through $R_{22}$ is selected from an alkyl, alkenyl, alkynyl, a partially halogenated alkyl, a totally halogenated alkyl, alkenyl, and a alkynyl group, wherein additionally $R_1$ through $R_7$, $R_9$, $R_{10}$, $R_{15}$, $R_{16}$, $R_{19}$, $R_{20}$, and $R_{22}$ can be selected from an ether, an ester, an amine, an amide, an imide, a sulfide, a thioester, a carbonate, and a carbamate group.

7. The capacitor of claim 1 wherein said norbornylene-containing polymer comprises a polymer dielectric formed using a method selected from ring opening metathesis and acyclic diene metathesis.

8. The capacitor of claim 1 wherein the operating frequency range is between 100 Hz and 1 GHz.

* * * * *